United States Patent [19]

Holm

[11] Patent Number: 4,751,664
[45] Date of Patent: Jun. 14, 1988

[54] ENCLOSURE DEVICE WITH MAGNETICALLY ATTACHED CALCULATOR

[75] Inventor: Ronald A. Holm, Maplewood, Minn.

[73] Assignee: Duratec Corporation, St. Paul, Minn.

[21] Appl. No.: 841,933

[22] Filed: Mar. 20, 1986

[51] Int. Cl.[4] .............................. G06F 15/30
[52] U.S. Cl. ........................... 364/705; 364/708
[58] Field of Search ................. 364/705, 708, 715

[56] References Cited

U.S. PATENT DOCUMENTS

| | | | |
|---|---|---|---|
| D. 241,381 | 9/1976 | Garnier | D87/3 A |
| D. 246,205 | 10/1977 | Lewis | D87/3 A |
| D. 274,179 | 6/1984 | Siwula | D18/7 |
| 402,491 | 4/1889 | Thomas | 128/1.3 |
| 3,150,296 | 9/1964 | McIntosh | 317/159 |
| 3,195,022 | 7/1965 | Staver | 317/159 |
| 3,262,479 | 7/1966 | Leguillon | 150/40 |
| 3,629,756 | 12/1971 | Holtz | 335/285 |
| 3,920,979 | 11/1975 | Kilby et al. | 364/705 |
| 4,075,702 | 2/1978 | Davies | 364/705 |
| 4,096,577 | 6/1978 | Ferber et al. | 364/708 X |
| 4,100,684 | 7/1978 | Berger | 35/62 |
| 4,158,230 | 6/1979 | Washizuka et al. | 364/708 |
| 4,209,735 | 6/1980 | Yoshida | 364/708 X |
| 4,222,109 | 9/1980 | Siwula | 364/715 |
| 4,224,675 | 9/1980 | Pinkerman | 364/705 |
| 4,531,320 | 7/1985 | James | 40/621 |
| 4,577,286 | 3/1986 | Yoshimura et al. | 364/708 |
| 4,587,409 | 5/1986 | Nishimura et al. | 364/705 X |

Primary Examiner—David H. Malzahn
Attorney, Agent, or Firm—Kinney & Lange

[57] ABSTRACT

An enclosure has a first flap member portion and a second member flap portion flexibly connected to each other so that the flap member portions may be moved away from and toward each other. In one embodiment, the enclosure retains a check recordal pad and a blank check pad. A calculator is magnetically attached to the first flap member.

13 Claims, 1 Drawing Sheet

ENCLOSURE DEVICE WITH MAGNETICALLY ATTACHED CALCULATOR

BACKGROUND OF THE INVENTION

1. Field of the Invention.

The present invention relates to a device wherein a calculator or other computing devices are attached to an enclosure and the enclosure retains a pad for use with the calculator. In particular, the present invention relates to magnetically attaching the calculator or other computing device to the enclosure.

2. Description of the Prior Art.

Typically, bank check pads are carried in an enclosure which also retains a check recordal pad to be used with the blank check pads. When a check or deposit slip is made out and taken from the pad, the depositor checks information, including the check sequence number, date, pay, amount and the like and this data is recorded in the check recordal pad and the running balance is mentally calculated and recorded. Errors are frequently made in the subtraction or addition which must be mentally calculated to determine the current balance. The errors are difficult to detect and are usually carried along until the check accounting owner receives a monthly statement and tries to balance his or her checking account. Considerable work is then needed to trace the source of the error or errors.

Although mechancial and/or electronic calculators are used to correctly calculate checking account balances, most persons do not have them available for use each time a check is drawn. Thus, the owner of the checking account may record check and deposit information without mentally calculating the current balance, waiting until a calculator is conveniently available. However, this task is often delayed and can result in overdrafts and poor financial control.

There have been attempts in the prior art to include a calculator with the enclosure so that a calculator is available when a check is drawn and recorded in the recordal pad. However, most of the prior art arrangements retain the calculator in a manner wherein the calculator is difficult to detach from the enclosure or is inconvenient to use. Some examples of the prior art arrangements are described in the following patents.

The Pinkerman U.S. Pat. No. 4,224,675 discloses a portable checkbook balance calculating device that includes a checkbook cover, a check recordal pad and a calculator held in a cover by tabs or the like in one or more cover pockets. The calculator must be slid from its hidden position within the pocket to a position clearing the checkbook cover to be used for calculating checking account balances. Thus, access to the calculator is somewhat inconvenient. In the extended position, the calculator can easily drop out of the checkbook, damaging the calculator. With frequent use, the calculator tab assembly could become weakened resulting in separation of the calculator from the device.

The Davies U.S. Pat. No. 4,075,702 describes a calculator/check pocket book wherein the calculator includes two flap members. One flap member is adapted for supporting the calculator and the second flap member is adapted for folding over the calculator in a facing relationship with the other flap member for forming a wallet-like enclosure that holds the calculator. Use of the calculator/check pocket book with a check recordal pad and check pad would require flipping back and forth between the calculator and the check recordal pad to calculate the current balance.

U.S. Pat. Nos. Des. 274,179, to Siwula, Des. 246,205 to Lewis, and Des. 241,381 to Garnier, disclose checkbook wallets with calculators. The Siwula, Lewis and Garnier Patents appear to show the calculator to be either permanently affixed to the checkbook wallets or held within the wallets by extending through a hole located in one of the wallet pockets with the calculator having a flange along its base that retains the calculator in the wallet.

SUMMARY OF THE INVENTION

The present invention includes an enclosure having a first flap member portion and a second flap member portion flexibly attached to each other so that the two flap member portions may be moved to a position adjacent each other. An electronic calculator is magnetically attached to the first flap member for use with any pads that are retained in the enclosure.

Preferably the electronic calculator is magnetically attached to a tab member which is flexibly connected to the first flap member such that the tab may be moved from a first position adjacent to the first flap member and to a second position away from the first flap member.

The present invention provides a novel arrangement for timely, convenient calculation of checking account balances when the enclosure retains a check recordal pad and a blank check pad. With the calculator being magnetically attached to the device, the calculator is conveniently available for calculating current checking account balances since it is easily detached and reattached.

With the calculator being perferably attached to the tab member, the calculator and the tab member are folded over the check recordal pad to retain the used pages of the recordal pad serving as a page marker. In addition, the calculator is presented to the user such that flipping back and forth between the recordal pad and the calculator is no longer required, as in the prior art devices, when computing the current checking account balance.

DETAILED DESCRIPTION OF THE PREFERRED EMBODIMENTS

Figure 1:
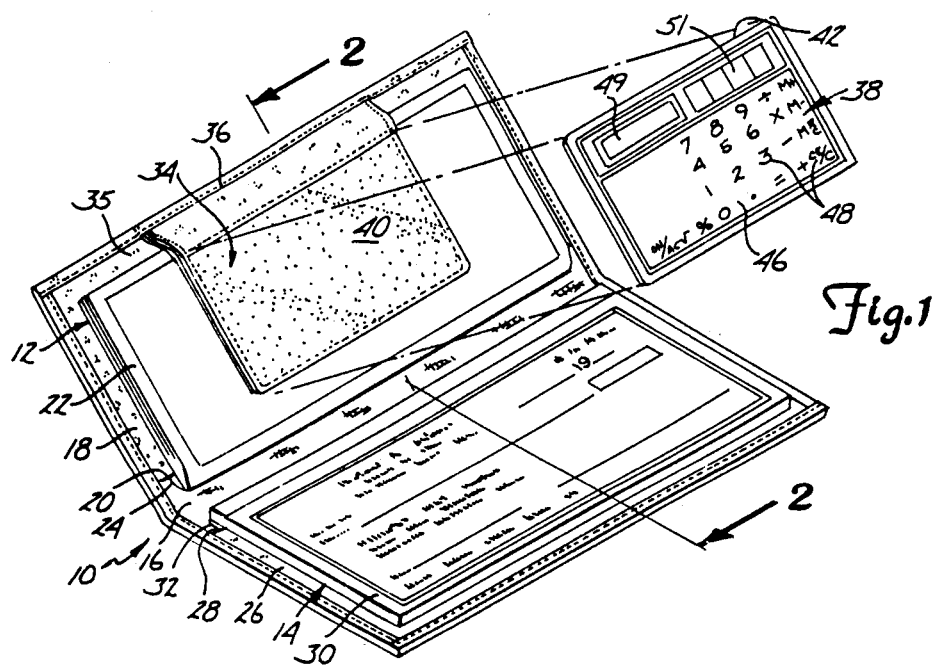
FIG. 1 is a perspective view of the present invention.

An enclosure device of the present invention is generally illustrated at 10 in FIG. 1. The enclosure device 10 includes a first flap member portion 12 and a second flap member portion 14. The member portions 12 and 14 are flexibly connected to each other by a hinging section 16 that runs along the length of the first and second flap member portions 12 and 14. The flap member portions are movable away from each other to an open position and toward each other to a closed position. The first flap member portion 12 has an inwardly facing pocket 18 extending across the width of the first flap member portion 12. The pocket has an opening 20 located proximate the portion 16. The opening 20 extends across the width of the first flap member portion 12.

A check recordal pad 22 or the like is retained in the enclosure device. The pad 22 has a front retaining flap 24. The flap 24 is inserted through the opening 20 into the pocket 18 so that the recordal pad is held in place within the enclosure device 10.

The second flap member portion 14 also has an inwardly facing pocket 26 extending across the width of the second flap member portion 15. The pocket 26 has an opening 28 located proximate the portion 16. The opening 28 extends across the full width of the second flap member portion 14.

A pad 30 of blank checks or the like are retained in the device 10. The pad 30 has a rear retaining flap 32 which is inserted through the opening 28 into the pocket 26 to hold the pad 30 in place on the second flap member portion 14.

Although an enclosure device for holding the check recordal pad and the blank check pad has been described, it will be understood that other types of enclosure devices such as devices for holding blank notebook pages are also includable within the present invention.

Preferably, the device 10 includes a tab member 34 flexibly attached proximate a top section 35 of the first flap member portion 12. The tab member 34 may be attached by any type of method such as being sewn to the first flap member portion. An important feature of the tab member is that it may be moved, as indicated by arrow 37 from a first position that is adjacent to the first flap member portion and to a second position away from the first flap member portion so that the pages of the check recordal pad are usuable in a convenient manner.

A calculator 38 or other similar computing device is magnetically attached to the tab member 34 such that the calculator 38 may be easily detached and attached to the tab member 34. Perferably, a magnetic strip 40 is attached to the tab member portion and is a part thereof.

The calculator 38 is preferably a conventional calculator manufactured by conventional electronic and microelectronic technology and includes a ferrous backing 42. It will be understood that a ferrous element can be attached to the tab member 34 with the calculator backing 42 including the magnetic element and be within the scope of the present invention.

The magnetic strip 40 is well known in the art and is made of a flexible polymeric material such as rubber serving as a matrix in which particles of a magnetic material are interspersed therein. An important feature of the magnetic strip is that it is thin, and one embodiment being as thin as 1/32 of an inch, so that when the first and second flap member portions are folded toward each other, the device 10 is as thin as possible.

Figure 2:
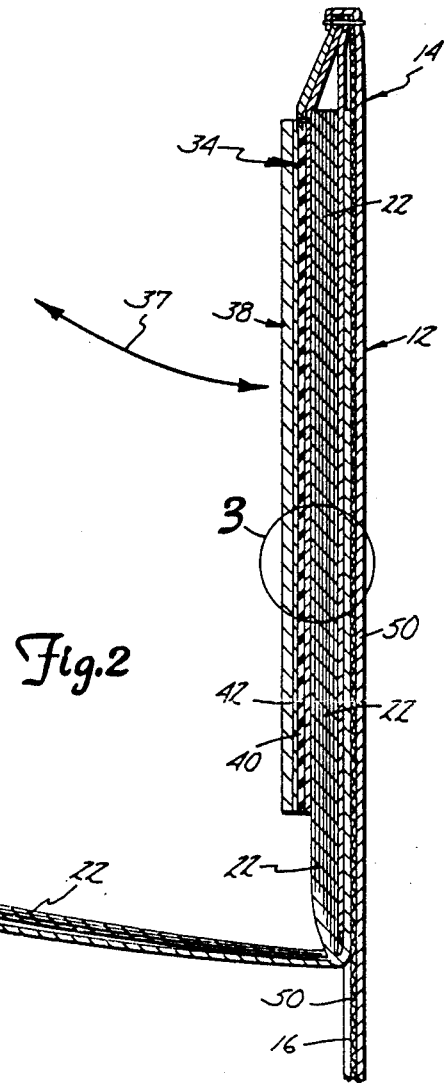
FIG. 2 is a cross sectional view of the construction of first flap member, check recordal pad, tab member, and calculator taken along the line 2—2 of FIG. 1.

The calculator 38 being magnetically attached to the tab member 34 is conveniently available for calculating current checking account balances and is easily detached and reattached for auxiliary use. As illustrated in FIG. 2, the calculator 38 and tab member 34 are folded over the check recordal pad 22 to retain the used pages of the recordal pad and serves as a page mark. In addition, the calculator 38 is presented to the user such that flipping back and forth between the recordal pad and the calculator is no longer necessary when computing the current checking account balance.

The calculator 38 can be of any suitable type. An important feature of the calculator is that it is small and thin. One suitable calculator 38 that has been used by the applicant in a working embodiment of the present invention is approximately 3 5/16 inches wide and 2 1/16 inches high and is approximately 1/16 of an inch thick. The calculator includes a key pad assembly 48 for entering numbers into the calculator, internal electronics (not shown) for computing the entered numbers, and a display 49 such as a liquid crystal display so that the computation results are shown to the user. In the working embodiment, the calculator key pad assembly 48 is flush with a surface of the calculator. The calculator key pad 48 and display 49 are preferably covered with a continuous sheet of plastic or other flexible material and is flush with the surface of the calculator. The calculator also preferably includes a solar cell power supply 51.

Figure 3:
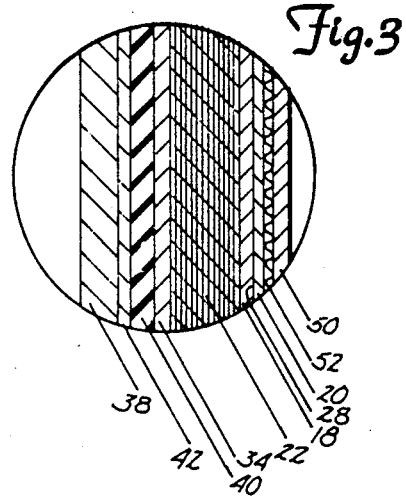
FIG. 3 is an expanded fragmentary cross sectional view of the first flap member, check recordal pad, tab member, and calculator.

The construction of the first flap member portion 12, the second flap member portion 14 and the hinging section 16 are made of a suitable exterior cover material 50, as best illustrated in FIG. 3. The exterior cover material is leather, vinyl, cloth or the like and preferably a cloth lining 52 is affixed to the cover material 50. Preferably, the member portions 12 and 14 and the hinging section 16 are part of one unitary piece of material. Persons skilled in the art will recognize that other suitable constructions of the first and second flap member portions 12 and 14 and connecting portion 16 that are manufactured using conventional techniques are within the scope of the present invention.

Although the present invention has been described with reference to preferred embodiments, workers skilled in the art will recognize that changes may be made in form and detail without departing from the spirit and scope of the invention.

What is claimed is:

1. An enclosure device comprising:
   enclosure means including at least first and second flap member portions hingedly joined to each other such that the first and second flap member portions are movable toward each other to a position substantially adjacent each other;
   calculator means having means for inserting data, means for displaying results of data insertion and means for computing the results;
   a tab member portion hingedly attached to the first flap member; and
   magnetic means for detachably attaching the calculator means to the tab member portion, the magnetic means being disposed between the calculator means and the tab member portion when the calculator means is attached to the tab member portion.

2. The device of claim 1 wherein the magnetic means includes a ferrous backing attached to the calculator means and a magnetic element attached to the first flap member.

3. The device of claim 1 wherein the calculator means includes a housing and wherein the magnetic means includes a magnetic element attached to the calculator housing and a ferrous element attached to the first flap member.

4. The device of claim 1 wherein the magnetic means includes a ferrous element as part of the calculator means and a magnetic element fixedly attached to the tab member portion.

5. The device of claim 4 wherein the magnetic element consists of a polymeric matrix and magnetic particles retained therein.

6. The device of claim 1 wherein the magnetic means includes a magnetic element as part of the calculator means and a ferrous element fixedly attached to the tab means.

7. The device of claim 6 wherein the magnetic element consists of a polymeric matrix and the magnetic particles retained therein.

8. The device of claim 1 wherein a check recordal pad is retained in the device by the first flap member portion and the tab member portion is attached near a top section of the first flap member portion such that the tab member portion is used as a page mark.

9. The device of claim 1 wherein the first and second flap member portions are made of a single piece of flexible material.

10. The device of claim 1 wherein the calculator means includes a solar power supply.

11. The device of claim 10 wherein the calculator means includes a surface and the solar supply is substantially flush with the top surface.

12. The device of claim 1 wherein the calculator means includes a top surface and the means for inserting data is substantially flush with the top surface.

13. The device of claim 1 wherein the calculator has a surface and the means for displaying is substantially flush with the surface.

* * * * *